UNITED STATES PATENT OFFICE 2,647,902

METHOD FOR THE PREPARATION OF TETRAHYDROISOQUINOLONE DERIVATIVES

Thomas Carl Aschner, Philadelphia, Pa., assignor to Smith, Kline & French Laboratories, Philadelphia, Pa., a corporation of Pennsylvania No Drawing. Application February 16, 1951, Serial No. 211,424

3 Claims. (Cl. 260—289)

This invention relates to a method for the preparation of certain tetrahydroisoquinolone derivatives.

The tetrahydroisoquinolone derivatives prepared by the method according to this invention are useful as intermediates in the preparation of compounds which possess physiological activity and, more specifically, possess local anesthetic properties.

The tetrahydroisoquinolone derivatives prepared by the method according to this invention have been prepared heretofore by methods requiring the use of expensive materials and involved procedures requiring special equipment. The method according to this invention enables the production of such compounds from relatively inexpensive materials and intermediates in an economical and efficient manner, with elimination of many steps involved in previous methods for the production of such compounds and with extremely high yields.

Generally speaking, the method according to this invention comprises treating a β-phenylethylisocyanate or carbamyl chloride in a solvent sufficiently inert to eliminate its entering into the reaction, with an acidic condensing agent.

Broadly, the tetrahydroisoquinolone derivatives prepared by the method according to this invention will have the structure:

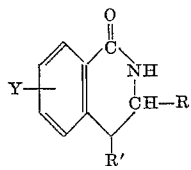

in which:

Y is a member of the group consisting of hydrogen, lower alkyl groups and lower alkoxy groups.

R is a member of the group consisting of hydrogen, lower alkyl groups, a phenyl group and a benzyl group.

R' is a member of the group consisting of hydrogen and lower alkyl groups.

The above compounds will be prepared by the treatment indicated from β-phenylethylisocyanates having the structure:

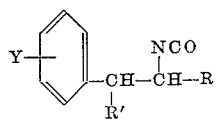

in which Y, R and R' are as given above.

The β-phenylethylisocyanates or carbamyl chlorides used as starting materials in carrying out the method according to this invention will be prepared economically and conveniently from the corresponding amines, which are readily available or will be prepared by standard techniques well known in the art, by treatment with phosgene gas in a suitable medium, as, for example, chlorobenzene or nitrobenzene, or the like. The reaction for preparation of the isocyanate starting materials is illustrated as follows:

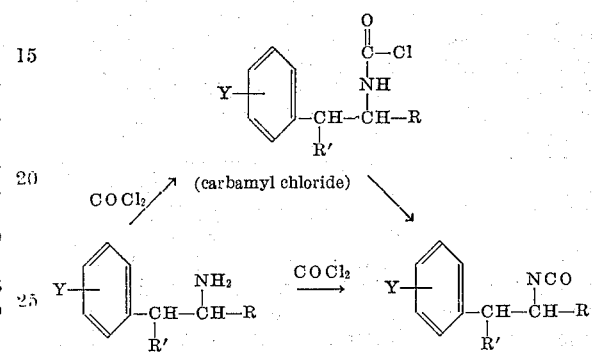

in which Y, R, and R' are as given above.

The isocyanate starting materials produced as by the above reaction will be isolated by usual procedures depending upon the physical properties of the compounds, as, for example, distillation, fractionation and evaporation.

Alternately, the β-phenylethylcarbamyl chloride, prepared as an intermediate in the preparation of the isocyanate starting material, may be utilized directly as a starting material itself, to be treated with the acidic condensing agent to effect ring closure. This has the added advantage of allowing one to utilize the reaction mixture resulting from the preparation of the starting material in situ, eliminating the necessity for isolation and purification of the isocyanate per se. The mechanism of this reaction is the same as that for the isocyanate, the only difference being that a molecule of hydrogen chloride is eliminated when the carbamyl chloride is utilized. As will be seen from the reactions below, that same molecule of hydrogen chloride is eliminated from the carbamyl chloride when the isocyanate is isolated first as a starting material. Hence, the difference merely lies in when that molecule of HCl is actually eliminated: either in the preparation of the isocyanate starting material, or in the subsequent ring-closure step with the carbamyl chloride.

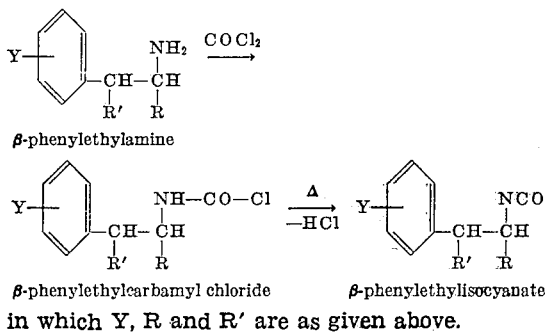

β-phenylethylamine

β-phenylethylcarbamyl chloride    β-phenylethylisocyanate in which Y, R and R' are as given above.

*Alternate general reaction*

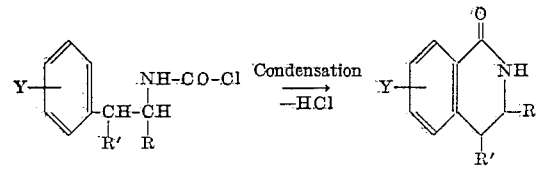

in which Y, R and R' are as given above.

More specifically, in carrying out the method in accordance with this invention a phenylethylisocyanate or carbamyl chloride having the structure indicated above will be treated as indicated in a solvent sufficiently inert to eliminate its entering into the reaction as, for example, carbon disulfide, cyclohexane, nitrobenzene, or the like. The treatment, as indicated, will be with a strongly acidic condensing agent of the Friedel-Crafts type, for example, ferric chloride, aluminum chloride, zinc chloride, boron trifluoride, stannic chloride, or the like.

The treatment will be at ordinary or slightly elevated temperatures, preferably in the range of 10° to 100° C. depending on the particular condensing agent utilized. The treatment will effect an intramolecular reaction which is exothermic, the rate of which and temperatures attained depending entirely upon the reactivities of the particular starting material and catalyst used. Also, it may be desirable to utilize a catalyst of lower order of activity with a starting material known to be highly reactive, to the end that both the rate and temperature of the reaction may be readily controlled.

The method according to this invention will be illustrated by the following general reaction:

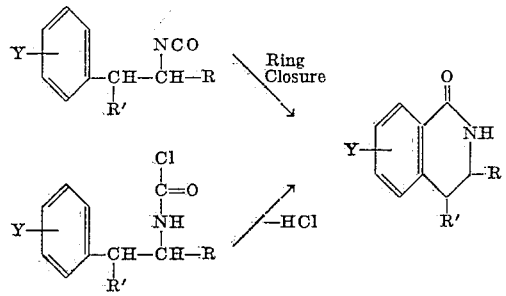

in which Y, R and R' are as given above.

The compounds produced according to the method of this invention will, as has been indicated, find utility as intermediates for the preparation of compounds having physiological activity. Thus, by way of example, the tetrahydroisoquinolones prepared by the method of this invention may be dehydrogenated, using well known techniques to the corresponding dihydro- isoquinolone which in turn will be readily converted to aminoalkoxyisoquinolines having utility, for example, as local anesthetic agents. The use of the compounds produced by the method according to this invention is, by way of example, illustrated by the following reaction:

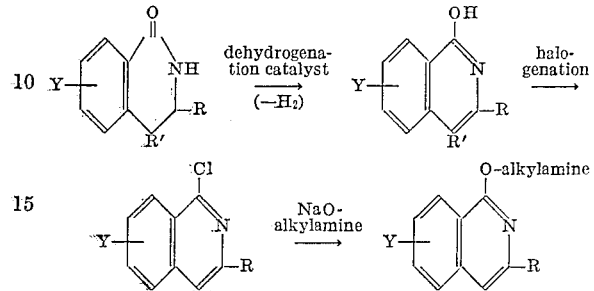

wherein Y, R and R' are as indicated above.

Specific procedure involved in carrying out the method in accordance with this invention will be illustrated by the following examples:

EXAMPLE 1

*3-butyltetrahydroisoquinolone-1*

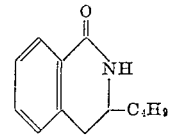

One mole of 1-phenylhexaneisocyanate-2, prepared by treatment of 1-phenyl-2-aminohexane with phosgene, is reacted with 2 moles of aluminum chloride by heating in nitrobenzene at 80° C. for approximately three hours. The mixture is poured into water, the organic layer is washed with aqueous hydrochloric acid and water and is then fractionated. Upon evaporation of the solvent under vacuum the remaining high boiling residue crystallizes upon cooling. Washing with petroleum ether and recrystallization from aqueous ethanol provides a nearly colorless, practically pure 3-butyltetrahydroisoquinolone-1 which melts at 98–99.5° C.

As specifically illustrative of the utility of the products of this invention is the following conversion of the above-prepared tetrahydroisoquinolone to 1-(β-dimethylaminoethoxy)-3-butylisoquinoline. The 3-butyltetrahydroisoquinolone-1 prepared above is treated with 10%, by weight, of palladium on charcoal catalyst at 200° C. Extraction of the reaction mixture with hot chloroform, followed by evaporation, yields a product of 3-butyldihydroisoquinolone-1 which has a melting point of 138–139° C.

A mixture of 10.0 g. of β-dimethylaminoethanol and 1.9 of sodium in 90 cc. of dry xylene is heated at 95° C. for five hours. To the resulting solution is added at 30° C., 18 g. of 3-butyl-1-chloro-isoquinoline, prepared from the dihydroisoquinolone with phosphorous oxychloride. The solution, which turns very dark, is heated at 100–125° C. for 3.5 hours. The mixture is extracted with two 100 cc. portions of 2 N hydrochloric acid solution. The acid solution is made strongly alkaline with 40% potassium hydroxide solution and the oil which separates is taken into ether. The ether solution is washed with two 100 cc. portions of water saturated with sodium chloride, and then dried over anhydrous sodium sulfate for three hours. The sodium sulfate is removed by filtration and the ether by distillation. Distillation of the residual oil gives a colorless liquid, B. P. 155–157°/3 mm. This compound, having the following structure, is a potent local anesthetic agent:

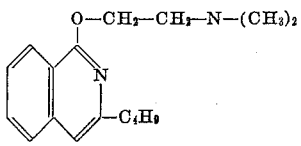

EXAMPLE 2

3-ethyltetrahydroisoquinolone-1

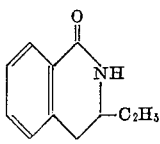

This compound is prepared from 1-phenylbutaneisocyanate-2 using a procedure identical with that described for the preparation of Example 1 above.

EXAMPLE 3

3-methyltetrahydroisoquinolone-1

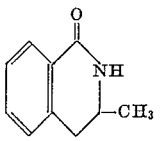

67.5 g. of β-phenylisopropylamine is dissolved in 290 g. of chlorobenzene into which is bubbled dry HCl until the reaction is completed. 120 g. of phosgene is introduced into the reaction mixture over a period of three hours after which the chlorobenzene is distilled off from the reaction mixture. 250 cc. of carbon tetrachloride is added to the slurry, followed by refluxing, whereupon the hot liquid is filtered. Upon cooling the filtrate solidifies and the solids are separated from the liquid medium by centrifuging. Distillation off of the carbon tetrachloride followed by fractionation of the residual liquid yields the β-phenylisopropylisocyanate.

9.13 g. of aluminum chloride in 26 cc. of nitrobenzene is placed in a three-neck reaction flask equipped with stirrer, thermometer, addition funnel, and a reflux condenser. 10 g. of β-phenylisopropylisocyanate prepared above is mixed with 26 cc. of nitrobenzene and the mixture is added dropwise to the contents of the flask. The reaction temperature is controlled by the rate of addition to a range of 70–80° C. After the addition of about ¾ of the isocyanate the reaction temperature goes down, whereupon the temperature is maintained by heating at 75° C. for one hour. The reaction mixture upon cooling is hydrolyzed with 50 cc. of water and washed thoroughly with chloroform. Evaporation of the chloroform and nitrobenzene yields a residue, which, upon being taken up into benzene, followed by evaporation of the solvent, washing with ether and evaporations, yields a nearly white crystalline solid which melts at 130–132° C.

EXAMPLE 4

3-benzyltetrahydroisoquinolone-1

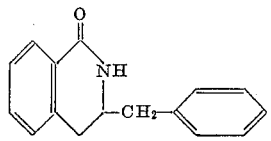

31.5 g. of dibenzyl carbinamine, prepared from the treatment if dibenzyl ketone with 85% formic acid and formamide followed by hydrolysis in 25% sulfuric acid, is dissolved in 186 g. of nitrobenzene and dry HCl is bubbled into the solution to form the hydrochloride salt of the amine. Approximately 150 g. of phosgene is bubbled through the solution for two hours maintaining a reaction temperature of 145° C. After cooling, the reaction mixture comprises an entirely liquid phase. Distillation of the nitrobenzene followed by fractionation of the residue yields a pure product which has a boiling point of 197° C. at 18 mm. of mercury.

20 g. of 1,3-diphenylpropylisocyanate-2 is added cautiously to 28 g. of aluminum chloride in 150 cc. of nitrobenzene, the reaction being a mildly exothermic one. The temperature is controlled and maintained at 75° C. for 2½ hours. The reaction complex thus formed is hydrolyzed in 100 cc. of cold water whereupon large amounts of aluminum gel are formed. The extract is washed with sodium hydroxide to eliminate the gel, and the water is removed using anhydrous magnesium sulfate. Distillation of the organic layers removes the nitrobenzene whereupon the crude product is obtained as a solid. Recrystallization from benzene followed by washing with petroleum ether yields the tetrahydroisoquinolone which has a melting point of 152–153° C.

EXAMPLE 5

3-phenyltetrahydroisoquinolone-1

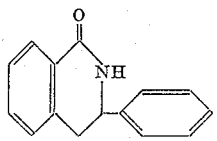

This compound is prepared following a procedure identical with that described for Example 4 above, with the exception that 1,2-diphenylethylisocyanate is utilized in place of 1,3-diphenylpropylisocyanate-2 as a starting material. This starting material is prepared by treatment of α,β-diphenylethylamine with phosgene as described in Example 3 above.

EXAMPLE 6

7-butyltetrahydroisoquinolone-1

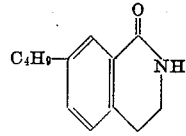

p-Butylbenzyl chloride, prepared by chloromethylation of butylbenzene, B. P. 137–138° C./21 mm., is treated with dilute alcoholic potassium cyanide to yield p-butylbenzyl cyanide, B. P. 163–165° C./19 mm. The nitrile so prepared is reduced with hydrogen at 1200 p. s. i. and at room temperature using a Raney nickel catalyst to yield β-(p-butylphenyl)-ethylamine which boils at 148–141° C./21 mm.

To 250 g. of phosgene dissolved in 500 cc. of anhydrous toluene is added 80 g. of β-(p-butylphenyl)-ethylamine mixed with 125 cc. of anhydrous toluene. The reaction mixture is heated at 40° C. for one hour and then at 80–85° C. for two hours. The resulting clear solution is freed of solvent by distillation under reduced pressure and the residue fractionated to give β-(p-butylphenyl)-ethylisocyanate as a colorless oil, B. P. 153–156° C./16 mm.; $n_D^{24}$ 1.5061.

To 33.7 g. of aluminum chloride dissolved in 125 cc. of nitrobenzene is slowly added a mixture of β-(p-butylphenyl)-ethylisocyanate and 20 cc. of nitrobenzene at such a rate that the temperature remains between 60 and 65° C. The reaction mixture is heated at 63° C. for one hour and then, after cooling, hydrolyzed with 100 cc. of ice water. Removal of the nitrobenzene yields an oil which is fractionated to give 7-butyltetrahydroisoquinolone-1, B. P. 180–183° C./0.5 mm., $n_D^{24}$ 1.5545.

EXAMPLE 7

*3-methyl-7-methoxytetrahydroisoquinolone-1*

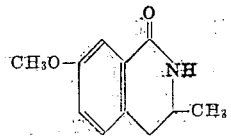

To 229 g. of phosgene dissolved in 400 cc. of anhydrous toluene is slowly added a mixture of 82.5 g. β-(p-methoxyphenyl)-isopropylamine and 100 cc. of anhydrous toluene. The residue remaining after removal of the toluene is treated with 500 cc. of boiling carbon tetrachloride and the insoluble material is removed by filtration. Concentration of the filtrate yields an oil which is fractionated under reduced pressure to give β-(p-methoxyphenyl)-isopropylisocyanate, B. P. 155–159° C./23 mm., $n_D^{23}$ 1.5180.

To 9.5 g. of β-(p-methoxyphenyl)-isopropylisocyanate, prepared as above, dissolved in 100 cc. of a mixture of 80 cc. of tetrachloroethane and 20 cc. of nitrobenzene, cooled in an ice bath, is added 13.3 g. of aluminum chloride at such a rate that the temperature does not exceed 5° C. The reaction mixture is maintained at −15° C. for four days when it is hydrolyzed by means of 100 cc. of dilute hydrochloric acid. Chloroform (100 cc.) is added and the organic layer separated and washed with water. Distillation of the chloroform and nitrobenzene leaves a residue, which, after being dissolved in boiling 99% isopropyl alcohol and cooling, yields a white crystalline solid melting at 149–150° C.

EXAMPLE 8

*4-methyltetrahydroisoquinolone-1*

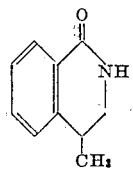

2-Phenylpropyl-1-isocyanate is prepared from 2-phenylpropylamine in a manner identical with that described for Example 3 in which 10.0 gms. of the isocyanate are treated with 9.5 gms. of aluminum chloride in 25 cc. of nitrobenzene to effect ring closure, preparing the tetrahydroisoquinolone end product.

EXAMPLE 9

*4-ethyltetrahydroisoquinolone-1*

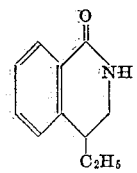

This compound is prepared using a procedure identical with that described for Example 3 above, except that 2-phenylbutyl-1-isocyanate, prepared from the corresponding 2-phenylbutylamine, is utilized as a starting material instead of β-phenylisopropylisocyanate.

EXAMPLE 10

*4-isopropyltetrahydroisoquinolone-1*

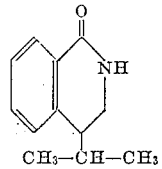

This compound is prepared using a procedure identical with that described for Example 3, above, except that 2-phenyl-3-methylbutylisocyanate, prepared from the corresponding 2-phenyl-3-methylbutylamine, is utilized as a starting material instead of β-phenylisopropylisocyanate.

EXAMPLE 11

*Preparation of 3-methyltetrahydroisoquinolone-1 from carbamyl chloride intermediates*

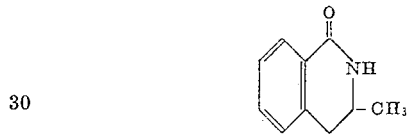

A solution of 67.5 gms. of β-phenylisopropylamine in 200 gms. of nitrobenzene is saturated with gaseous HCl. 120 gms. of phosgene is gradually introduced at room temperature and the resulting solution is allowed to stand at room temperature for several hours. Without further treatment or purification this reaction mixture is then utilized in situ to effect the ring closure step by the addition of a two-molar quantity of aluminum chloride in additional nitrobenzene to the reaction mixture, which is then placed in a three-neck reaction flask equipped with stirrer, thermometer, addition funnel and a reflux condenser. After the initial phase of the exothermic reaction is completed the temperature is maintained by heating to about 75° C. for from one to two hours. The final tetrahydroisoquinolone product is isolated and purified in a manner identical with that described in Examples 1–10, which product itself is identical with that obtained when the correspondingly pure isocyanate is used as a starting material.

EXAMPLE 12

*Preparation of 7-butyltetrahydroisoquinolone-1 from carbamyl chloride intermediates*

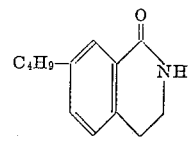

A solution of 250 gms. of phosgene in anhydrous nitrobenzene is used to dissolve 80.0 gms. of β-(p-butylphenyl)-ethylamine. The reaction mixture is allowed to stand at room temperature for a period of several hours. Without further treatment or purification this reaction mixture is then utilized in situ to effect the ring closure step by the addition of a molar quantity of aluminum chloride in additional nitrobenzene to the reaction mixture, which is then placed in a three-neck reaction flask equipped with stirrer, thermometer, addition funnel and a reflux condenser. After the initial phase of the exothermic reaction is completed the temperature is maintained by heating to about 75° C. for from one to two hours. The final tetrahydroisoquinolone product is isolated and purified in a manner identical with that described in Examples 1–10, which product itself is identical with that obtained when the isocyanate is used as a starting material.

EXAMPLE 13

*7-methoxy-3,4-dimethyltetrahydroisoquinolone-1*

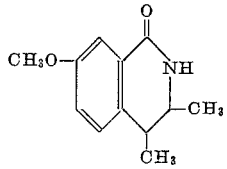

This compound is prepared using a procedure identical with that described in Example 7 above, except that the starting material, 2-(p-methoxyphenyl)-3-isocyanobutane will be prepared by treating 2-(p-methoxyphenyl)-3-aminobutane with phosgene in anhydrous toluene.

EXAMPLE 14

*7-butyl-3,4-dimethyltetrahydroisoquinolone-1*

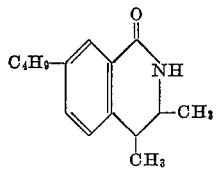

This compound is prepared using a procedure identical with that described in Example 7 above, except that the starting material, 2-(p-butylphenyl)-3-isocyanobutane will be prepared by treating 2-(p-butylphenyl)-3-aminobutane with phosgene in anhydrous toluene.

EXAMPLE 15

*4,8-dimethyl-3-butyltetrahydroisoquinolone-1*

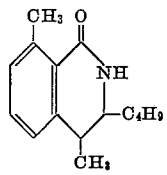

This compound is prepared using a procedure identical with that described in Example 7 above, except that the starting material, 2-(m-tolyl)-3-isocyanohexane will be prepared by treating 2-(m-tolyl)-3-aminohexane with phosgene in anhydrous toluene.

What is claimed is:

1. The method of preparing tetrahydroisoquinolone derivatives having the structure:

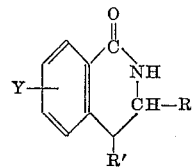

in which Y is a member of the group consisting of hydrogen, lower alkyl groups and lower alkoxy groups, R is a member of the group consisting of hydrogen, lower alkyl groups, a phenyl group and a benzyl group and R' is a member of the group consisting of hydrogen and lower alkyl groups, which comprises treating the reaction product of phosgene and a β-phenylethylamine of the structure:

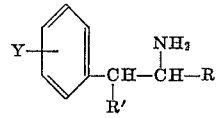

in which Y, R and R' are given, with a Friedel-Crafts type catalyst at a temperature in the range of about 5° to 125° C.

2. The method of preparing tetrahydroisoquinolone derivatives according to claim 1, characterized by the fact that the reaction product of phosgene and a β-phenylethylamine is in solution in a solvent which will not enter into the reaction.

3. The method of preparing tetrahydroisoquinolone derivatives according to claim 1, characterized by the fact that where the reaction product of phosgene and a β-phenylethylamine is highly reactive the catalyst is of a low order of activity.

THOMAS CARL ASCHNER.

References Cited in the file of this patent

UNITED STATES PATENTS

| Number | Name | Date |
|---|---|---|
| 2,478,805 | Butler | Aug. 9, 1949 |

OTHER REFERENCES

Dey et al., J. Indian Chem. Soc., vol. 13, pp. 281–283 (1936).